(12) United States Patent
Mazzola, Jr. et al.

(10) Patent No.: US 7,017,473 B2
(45) Date of Patent: Mar. 28, 2006

(54) COFFEE BREWER

(75) Inventors: Jack Mazzola, Jr., New York, NY (US); Ronald J. Ricciardi, Woodcliff Lake, NJ (US); Marc S. Landry, Vernon, NJ (US)

(73) Assignee: Jack's Coffee, LLC, New York, NY (US)

( * ) Notice: Subject to any disclaimer, the term of this patent is extended or adjusted under 35 U.S.C. 154(b) by 0 days.

(21) Appl. No.: 10/615,254

(22) Filed: Jul. 8, 2003

(65) Prior Publication Data

US 2005/0008744 A1 Jan. 13, 2005

(51) Int. Cl.
*A47J 31/00* (2006.01)

(52) U.S. Cl. .............. 99/287; 99/279; 99/290

(58) Field of Classification Search ............ 99/287, 99/286, 279, 290
See application file for complete search history.

(56) References Cited

U.S. PATENT DOCUMENTS

| 808,730 | A | | 1/1906 | DeGrody |
| 4,226,175 | A | * | 10/1980 | Sandor ............... 99/286 |
| 4,401,014 | A | | 8/1983 | McGrail et al. |
| 4,699,794 | A | | 10/1987 | Brice et al. |
| 4,911,067 | A | | 3/1990 | Oppermann |
| 4,983,412 | A | * | 1/1991 | Hauslein ............... 426/238 |
| 5,277,103 | A | | 1/1994 | Cox |
| 5,287,993 | A | | 2/1994 | Ford et al. |
| 5,358,725 | A | | 10/1994 | Izumitani et al. |
| 5,800,852 | A | | 9/1998 | Levinson |
| 5,957,035 | A | | 9/1999 | Richter |
| 5,992,299 | A | * | 11/1999 | Fong ............... 99/286 |
| 6,148,717 | A | * | 11/2000 | Lassota ............... 99/283 |
| 6,318,247 | B1 | | 11/2001 | Di Nunzio et al. |
| 6,532,862 | B1 | | 3/2003 | Mork et al. |
| 6,647,863 | B1 | * | 11/2003 | Lang ............... 99/287 |

FOREIGN PATENT DOCUMENTS

EP    1 402 803    3/2004

* cited by examiner

*Primary Examiner*—Reginald L. Alexander
(74) *Attorney, Agent, or Firm*—Fish & Richardson P.C.

(57) ABSTRACT

Systems and techniques to brew coffee are described. In general, in one implementation, the technique includes: releasing water from at least one water inlet onto ground coffee in a stationary coffee filter. The ground coffee is automatically agitated while the water is being released using an agitator that is connected to an agitator motor to aid flavor-enhancement during the brewing process by helping to assure that the coffee grounds are uniformly mixed, saturated and blended with hot water and to substantially maintain an evenness of depth of the ground coffee. The water, now containing extracted coffee chemicals, is collected in a coffee vessel.

9 Claims, 6 Drawing Sheets

COFFEE BREWER

BACKGROUND

The following description relates to coffee brewing techniques and devices.

Coffee may be brewed both at home and commercially by various methods including dripped and percolated. Dripped coffee may be favored, especially in commercial settings, because of preferable flavor, ease of preparation, or other reasons. In the dripped method, ground coffee may be placed in a coffee filter and the filter placed in a coffee holder. In some coffee brewers, the coffee holder may be constructed to function as both the holder and filter. For example, the coffee holder may have a fine mesh sieve at the bottom that retains the ground coffee but permits passage of liquids. Hot water is released at a predetermined rate onto ground coffee and the coffee chemicals carried from the ground coffee by the hot water, which then seeps through the coffee filter and is directed into a coffee vessel for immediate use or storage for later use.

The ground coffee may comprise a blend of two or more varieties of coffee beans. The coffee beans may be selected to provide a desired resultant brewed coffee having certain characteristics, for example, a balance of types of flavors and acidity. The strength of the brewed coffee may depend upon the length of time that the hot water is in contact with the ground coffee and the quantity of ground coffee available to provide the coffee flavoring chemicals. The rate at which water is released onto the ground coffee may be adjusted so that the hot water remains in the coffee holder long enough to brew the coffee before seeping through the filter and into the coffee vessel. The quantity of coffee in the holder may also be a factor in the length of time that the water remains in the holder. The holder flow-through rate and the water release rate are balanced so as to prepare a consistent strength of brewed coffee for a given amount of ground coffee.

SUMMARY

The present application describes systems and techniques relating to brewing coffee. In one aspect, brewing of coffee is facilitated by releasing water from at least one water inlet onto ground coffee in a stationary coffee filter. The ground coffee is automatically agitated while the water is being released using an agitator that is connected to an agitator motor. The agitation (or stirring) during the brewing process can promote flavor-enhancement of the coffee by helping to assure that the coffee grounds are uniformly mixed, saturated and blended with hot water. The agitation may substantially maintain an evenness of depth of the ground coffee, further aiding in the flavor-extraction process. The water extracts coffee chemicals and is collected after it has contacted the ground coffee.

The release of water may be automatically stopped after a predetermined amount of water has been released onto the ground coffee.

The automatic agitating of the ground coffee may be stopped a predetermined amount of time after the water has stopped being released.

In another aspect, an apparatus includes a retention vessel to receive an aqueous liquid; a stationary ground coffee holder removably coupled to the retention vessel and having a bottom effective to retain ground coffee and permit passage of aqueous liquid; at least one water inlet to provide water to be released onto the ground coffee; an agitator motor; and a coffee agitator connected to the agitator motor effective to agitate the coffee grounds during the brewing process to aid flavor-enhancement of the brewed coffee by helping to assure that the coffee grounds are uniformly mixed, saturated and blended with hot water. Also, the agitation substantially maintains the evenness of the depth of the ground coffee when the agitator motor is operating.

The apparatus may have a heating element in heating communication with the retention vessel. The heating element also may be arranged to heat water that is subsequently provided to the water inlets.

Control elements may be included to control at least one of the (a) amount of water released, (b) the temperature of the released water or (c) the operation of the agitator motor.

The coffee agitator may have protrusions to extend into the ground coffee when the apparatus is in operation. The protrusions may have a circular cross-sectional shape and may also be flared on the free end. The protrusions may have an elliptical cross-sectional shape.

The systems and techniques described here may provide one or more of the following advantages. In some implementations, the method can provide for uniform wetting of the ground coffee during brewing to enhance flavor production in the brewed coffee. The device can stir the coffee grounds during brewing without substantially disturbing the evenness of depth of the ground coffee in the coffee holder. A consistent brew of coffee may be achieved helping to assure that the water released onto the ground coffee contacts the ground coffee for a consistent amount of time to extract coffee chemicals before being collected.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

The systems and techniques described here relate to techniques and devices for making brewed beverages.

A coffee maker includes an agitator to stir coffee grounds as water passes through the grounds. A motor is coupled to the agitator to move the agitator when water is released onto the coffee grounds. When in operation, the coffee grounds are in a stationary coffee holder below the agitator, which allows the aqueous liquid to pass through the holder and collect in a retention vessel.

Figure 1:
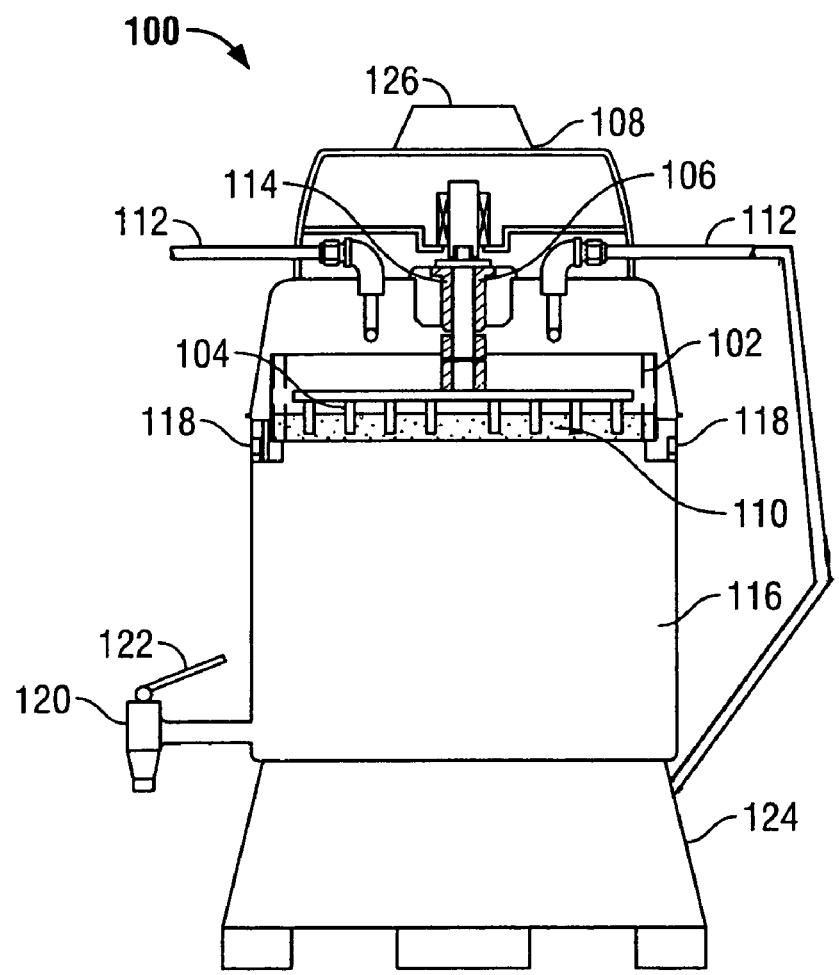
FIG. 1 is an illustration of an implementation of a coffee brewer with a coffee agitator.
Figure 2A:
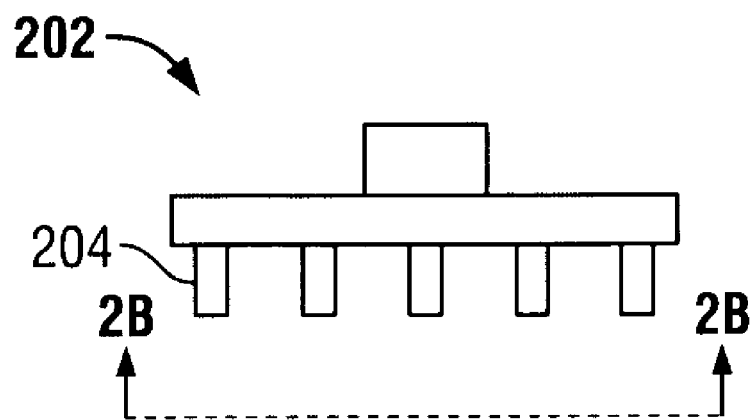
FIGS. 2A–2B illustrates an implementation of a coffee agitator having protrusions, which have a circular cross-sectional shape.
Figure 2B:
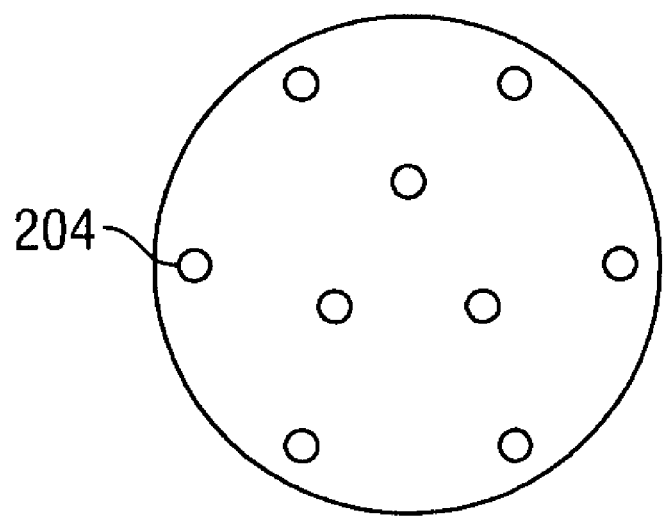
Figure 3A:
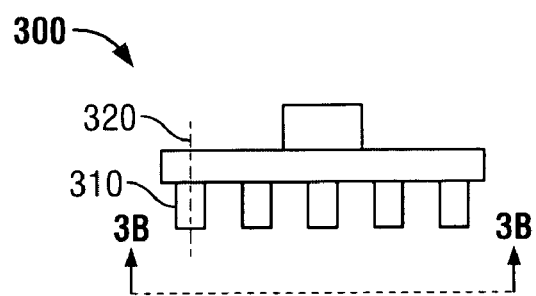
FIGS. 3A–3B illustrate an implementation of a coffee agitator having protrusions, which have an elliptical cross-sectional shape.
Figure 3B:
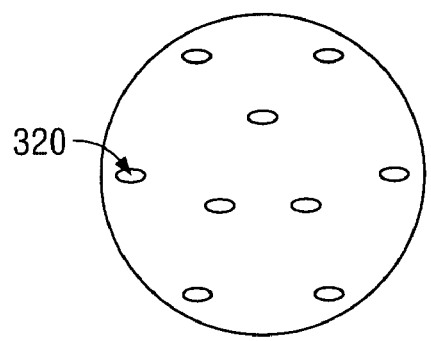

FIG. 1 illustrates an implementation of a coffee brewer 100 having a stationary ground coffee holder 102 and a coffee agitator 104. The coffee holder 102 may be arranged as a filter to retain ground coffee 110 (shown as dots) and allow an aqueous liquid to pass through at least the bottom of the holder. In another implementation, the ground coffee holder may have one or more holes in the bottom. In this case, the ground coffee may be in a filter (not shown) within the ground coffee holder 102 that permits an aqueous liquid to pass through the filter into the ground coffee holder and then through the holes in the holder. The filter may be permanent, disposable or reusable. An agitator drive shaft 106 couples the coffee agitator 104 to an agitator motor 108. In an implementation, a bushing 114 may be used to provide a bearing surface for the agitator drive shaft 106. In some implementations, the bushing may be of a synthetic material or any other suitable material. The bushing may be made of, or coated with, a self-lubricating material. In implementations where the shaft is sealed, a lubricating port may be provided to enable lubrication of the shaft 106 without permitting the lubricant to contaminate the ground coffee.

At least one inlet port 112 can be arranged to allow a fluid to be released onto the ground coffee. In an implementation, two or more inlet ports may be used. One or more valves (not shown) may be provided to enable or inhibit the release of fluid onto the ground coffee. A retention vessel 116 may be fitted with a support 118 to support the ground coffee holder 102 in the retention vessel. In an implementation, the coffee holder 102 is removably connected to the support 118. The coffee holder also may be arranged to act as a filter that retains the ground coffee but allows fluid to pass through. The retention vessel 116 may be situated to receive the aqueous liquid after the liquid has contacted the ground coffee. In some implementations, a discharge spout 120 may be coupled to the retention vessel 116. The discharge spout can be used to dispense the aqueous liquid from the retention vessel 116. A discharge valve 122 may be provided to enable or inhibit the flow of the aqueous liquid through the discharge spout 120.

A heating element 124 may be in heating communication with the retention vessel 116. The heat from the heating element also may be used to heat a liquid that may be supplied through piping to the inlet ports 112.

Hot water may be released from the inlet ports 112 onto the ground coffee 110 that is put in the fixed ground coffee retainer 102. In an implementation, the hot water supplied to the inlet ports 112 may be maintained at a temperature typically between about 180 and about 205 degrees Fahrenheit (82 and 96 degrees Celsius), preferably at approximately 200 degrees Fahrenheit (93 degrees Celsius) measured at the outlet of the inlet port 112. The hot water may pass through the ground coffee and the coffee holder 102 and collect in the retention vessel 116. While the water is being released from the inlet ports 112, the agitator motor 108 may be activated to cause the coffee agitator 104 to rotate.

The coffee agitator 104 may be arranged so that, when used, it helps to maintain the evenness of the ground coffee depth. Maintaining the evenness of depth of the ground coffee may help to provide consistency of the resultant brewed coffee by tending to cause the hot water to steep in the ground coffee for a consistent amount of time. That is, the hot water may steep longer in the ground coffee if the water is released onto an area where the depth of the ground coffee is deeper than in an area where the depth of the ground coffee is shallower. Such disparities could result when the ground coffee accumulates, or piles up, in front of a moving coffee agitator. The coffee agitator is located above the bottom of the coffee holder and is arranged so that the protrusions extend downwardly below the surface of the ground coffee when ground coffee is in the coffee holder. In one implementation, the motor may be controlled so as to rotate the coffee agitator in both a clockwise and a counter-clockwise direction. By rotating the coffee agitator in both directions, accumulation of the ground coffee 110 ahead of the agitator may be lessened. The rotational speed of the motor also may be adjusted to help reduce the accumulation, or piling up, of ground coffee ahead of the coffee agitator.

Ground coffee is often a blend of a variety of coffee beans. The particular beans selected may be chosen to achieve a desired combination of, for example, flavors, strength and acidity. The consistency of the resultant brewed coffee may depend on extracting the coffee flavors in the proportions desired. It is advantageous to assure that the grounds of all the selected beans are wetted equally and uniformly, for example, by forming a slurry. As the released water seeps through the ground coffee and the water level in the ground coffee holder decreases, some of the grounds may be above the surface of the water and not providing their flavor to the brew. Also, some of the wet grounds may tend to sink to the bottom of the coffee/water slurry. The coffee agitator, when in use, may be arranged to help evenly and uniformly distribute the various ground coffee varieties in the coffee slurry. In one implementation, the coffee agitator may be arranged to have protrusions or other surface features that stir the ground coffee without disproportionately affecting the ground coffee depth.

Figure 4:
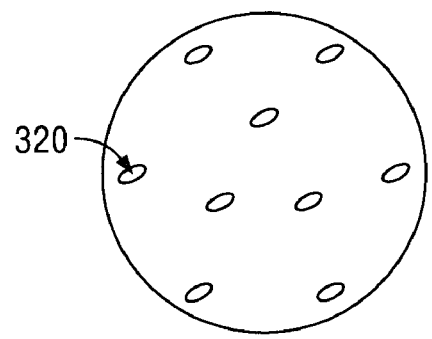
FIG. 4 illustrates the coffee agitator of FIG. 3 wherein the protrusions are rotated about a central longitudinal axis.
Figure 5A:
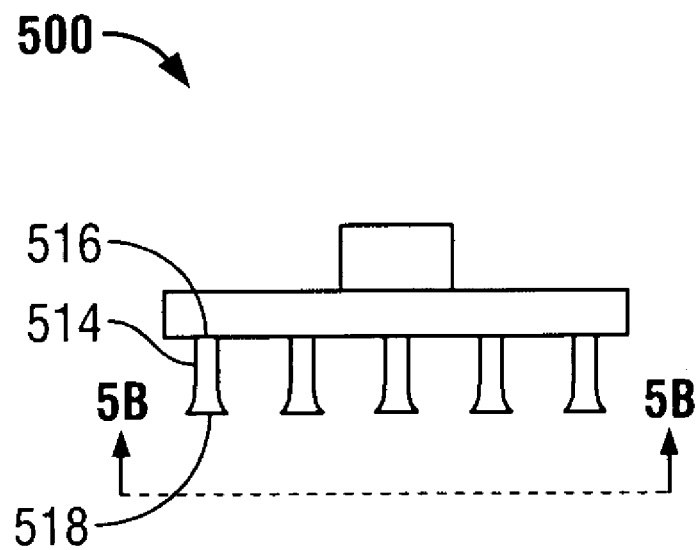
FIGS. 5A–5B illustrate an implementation of a coffee agitator having protrusions, which have a circular cross-sectional shape that is flared on a free end.
Figure 5B:
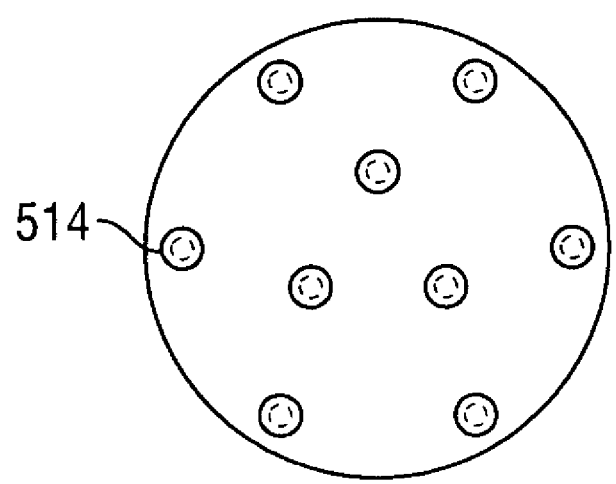
Figure 6A:
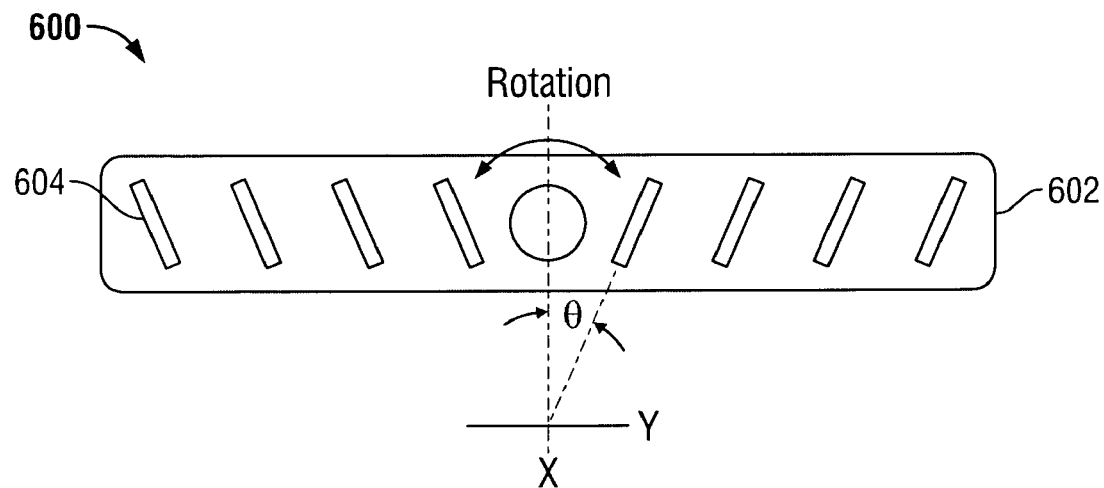
FIGS. 6A–6B illustrate a bottom and side view, respectively, of an implementation of a coffee agitator having protrusions that are adapted to the shape and dimensions of a coffee holder.
Figure 6B:
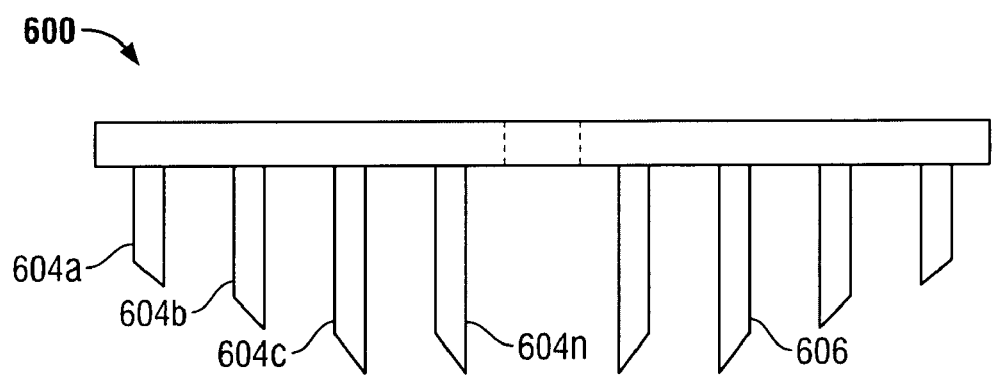
Figure 7:
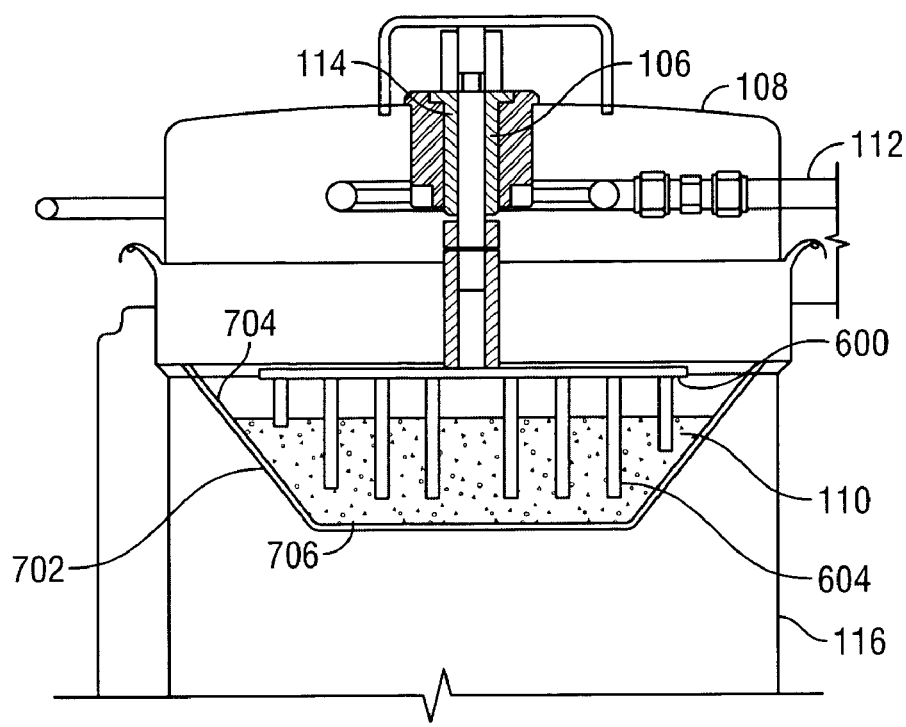
FIG. 7 illustrates the coffee agitator of FIG. 6 installed in a coffee brewer.

FIGS. 2–6 illustrate examples of coffee agitators. FIG. 2A illustrates a coffee agitator 202 having substantially cylindrical protrusions 204 that depend from a coffee agitator support surface 206. FIG. 2B view A—A illustrates the substantially circular cross-sectional shape of the protrusions 204. The length of the protrusions 204 may be selected to extend into the ground coffee in the coffee holder. The protrusions 204 may have a number and arrangement so as to stir the ground coffee without substantially disturbing the depth of the ground coffee. FIG. 3A illustrates a coffee agitator 300 having stirring protrusions 310 of a substantially elliptical shape. FIG. 3B view B—B illustrates the substantially elliptical cross-sectional shape having a central axis 320 of the protrusions 310. Again, the number and arrangement of the protrusions may be such to stir the ground coffee without substantially disturbing the depth of the ground coffee. The protrusions may be positioned at an angle on the agitator to achieve different degrees of agitation. FIG. 4 illustrates an alternative embodiment of the agitator of FIG. 3 B—B where the elliptical protrusions 310 are rotated about the central axis 320 of the elliptical protrusions. The rotation can result in a variation in agitation of the ground coffee as the coffee agitator is rotated because a different projected surface area is presented to the ground coffee. FIG. 5A illustrates a coffee agitator 500 having protrusions 514, which have a profile that may tend to stir the ground coffee so as to bring grounds from the bottom of the coffee towards the top. FIG. 5B view C—C illustrates the substantially circular cross-sectional shape of the protrusions 514, which are flared on a bottom end 518. The protrusions 514 are wider at the bottom end 518 than at the fixed end 516 so as to cause the ground coffee at the bottom of the coffee holder to be stirred upwards. FIG. 7 illustrates a coffee agitator 600 having protrusions 604 of varying lengths so as to generally conform to a shape of a coffee holder 702. The differing lengths can provide for agitation of the coffee grounds 110 close to the sidewalls 704 of the coffee holder. In the example illustrated, the coffee holder 702 has sidewalls 704 that are inclined with respect to the coffee holder bottom 706. The inclined sidewalls 704 can help prevent the coffee grounds from sticking to the sidewalls as the water level in the coffee holder decreases. FIGS. 6A–6B illustrate an implementation of the coffee agitator 600 of FIG. 7. Protrusions 604 may be attached to a protrusion support 602. In an implementation, the support can be a bar. Other shapes may be used. The protrusions 604 may be attached at an angle θ to an x-axis of an orthogonal x-y axis in the plane of agitator rotation. The angle θ is selected to agitate the coffee grounds in both the x and y directions and, in one implementation, is 15 degrees. The protrusions 604a–604n can be of any suitable number and of varying lengths generally to follow the shape of the coffee holder. The ends 606 of the protrusions may be shaped including tapered, flat and pointed.

Referring again to FIG. 1, after the water progresses through the ground coffee, the liquid may pass through the ground coffee holder 102 and collect in the retention vessel 116. In an implementation, the collected liquid may be dispensed through the discharge spout 120.

Liquid remaining in the retention vessel 116 may be kept at a predetermined temperature by the heating element 124. In an implementation, liquid may be circulated in piping (not shown) around the heating element so as to heat the liquid. Subsequently, the heated liquid may be provided to the inlet ports 112.

In an implementation, control circuitry 126 may be used to vary operation of the coffee brewer. For example, the control circuitry may be coupled to the agitator motor 108 to limit the operation of the agitator motor and, hence, the coffee agitator 104. For example, the control circuitry may provide that the agitator motor continue to operate for a predetermined time after the liquid has ceased to be released from the inlet ports 112. Thus, the ground coffee 110 continues to be agitated while some part of the liquid remains in the ground coffee holder 102. The control circuitry also may be coupled to the inlet port 112 to limit the amount of water released onto the ground coffee or control the temperature of the released water.

Figure 8:
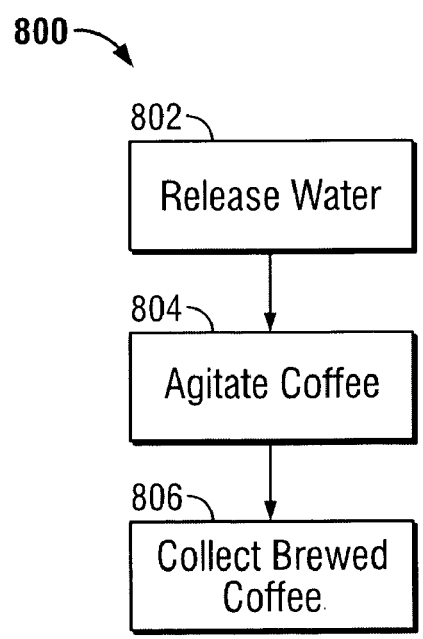
FIG. 8 is a flow chart showing a process for making stir-brewed coffee.

FIG. 8 is a flow chart 800 of an implementation of a method for making stir-brewed coffee. Hot water may be released 802 from water inlets onto ground coffee. The inlets may be arranged to evenly distribute the water onto the ground coffee. The hot water may be heated externally or heated by a heating element that also can serve to heat the brewed coffee. The hot water can seep through the ground coffee and extract the coffee chemicals while in contact with the ground coffee to provide stir-brewed coffee. The amount of water in contact with the ground coffee may depend upon at least the rate of water release and the flow-through rate through the ground coffee. The water and ground coffee can create a slurry that may be agitated 804. Agitation of the slurry may help to assure a uniformity of the mixture of various varieties of coffee (for example, beans, crops, roasts, and so on) that make up the ground coffee so that each variety contributes in desired proportion to the resultant brewed coffee. The agitation of the slurry can be implemented so as to involve the coffee varieties in the desired proportions. The agitation of the coffee grounds also may be implemented so that substantially all of the water that is released onto the grounds remains in the slurry for substantially the same amount of time and, thus, extracts substantially the same amount of coffee chemicals. The brewed coffee may be collected 806 in a suitable vessel after the added water seeps through the ground coffee.

Other embodiments may be within the scope of the following claims.

What is claimed is:

1. An apparatus comprising:
   at least one water inlet to provide water to be released onto ground coffee;
   a retention vessel to receive an aqueous liquid;
   a stationary ground coffee holder positioned between the at least one water inlet and the retention vessel and having a bottom effective to retain the ground coffee and permit passage of aqueous liquid;
   an agitator motor; and
   a coffee agitator connected to the agitator motor effective to agitate and substantially to maintain the evenness of the depth of the ground coffee in the coffee holder when the agitator motor is operating, the coffee agitator having protrusions to extend downwardly into the ground coffee at least when the apparatus is in operation;
   wherein the protrusions have a circular cross-sectional shape that is flared on a free end.

2. The apparatus of claim 1, wherein the protrusions have varying lengths so as to generally follow a shape of the coffee holder.

3. The apparatus of claim 2, wherein the protrusions are positioned at an angle with respect to an x-axis of an x-y axis of a plane of rotation of the coffee agitator.

4. The apparatus of claim 3, wherein the angle is approximately 15 degrees.

5. The apparatus of claim 1, wherein when the water is released a slurry of the ground coffee is formed.

6. The apparatus of claim 1, further comprising a heating element in heating communication with the retention vessel.

7. The apparatus of claim 6, wherein the heating element is arranged to heat water that is subsequently provided to the at least one water inlet.

8. The apparatus of claim 1, wherein the retention vessel includes a discharge spout operable to dispense the aqueous liquid from the retention vessel.

9. The apparatus of claim 1, further comprising control elements to control at least one of the (a) amount of water released, (b) the temperature of the released water or (c) the operation of the agitator motor.

* * * * *